Patented Dec. 16, 1952

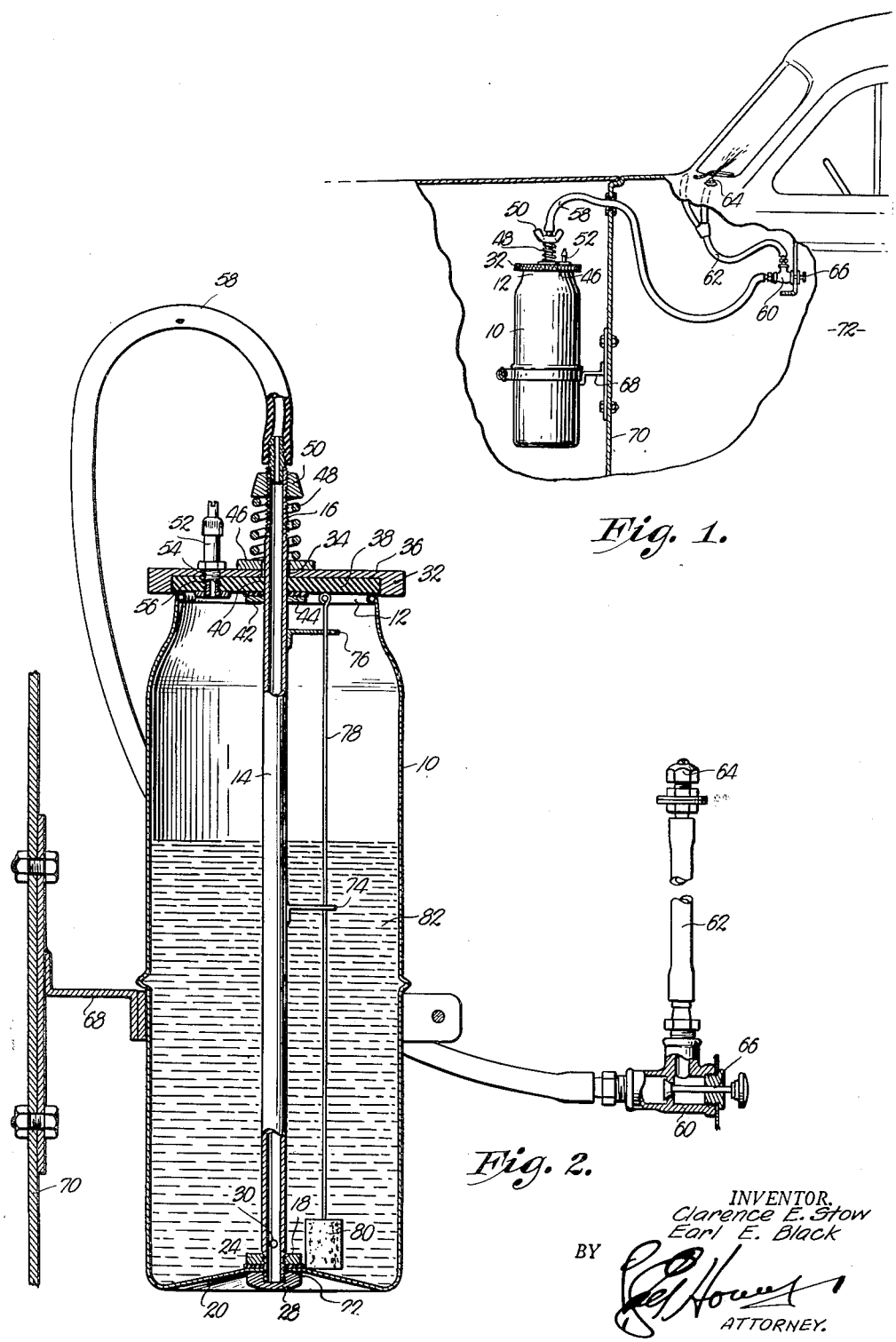

2,621,830

UNITED STATES PATENT OFFICE 2,621,830

CONTAINER FOR HYDROPNEUMATIC WINDSHIELD WASHER

Clarence E. Stow and Earl E. Black, Kansas City, Mo.

Application December 1, 1947, Serial No. 789,000

1 Claim. (Cl. 222—464)

This invention relates to the automotive field and particularly to accessories for automobiles, the primary object being to provide a windshield washer of the hydro-pneumatic type having a pressure tank equipped with a longitudinally disposed outlet tube and a cover for the tank reciprocably mounted upon the tube and held in closing relationship with respect to said tank by a coil spring also disposed in encircling relationship to said tube.

The most important object of this invention is the provision of a hydro-pneumatic windshield washer having an open top pressure tank provided with a safety cover yieldably held in closing relationship with respect to the tank by a coil spring, said cover having a resilient gasket forming a part thereof and serving a secondary purpose of sealing an air inlet cut-off valve.

Other objects of this invention include the precise manner in which the aforesaid reciprocable safety cover is supported by the outlet tube for the pressure tank, the latter being secured to said tank near the bottom thereof; the way in which a secondary gasket is utilized to positively prevent leakage at the point of engagement between the main gasket and the tube; and the way in which said tube serves to support a gage for determining the amount of liquid within the pressure tank.

Many minor objects will be made clear or become apparent during the course of the following specification, reference being had to the accompanying drawing, wherein:

Figure 1 is a side elevational view of a hydropneumatic windshield washer made in accordance with the present invention showing the same operably associated with an automobile; and Fig. 2 is a substantially central, vertical, longitudinal view through the pressure tank per se, together with associated parts, a portion of the release valve being broken away for clearness.

A hollow, generally elongated pressure tank 10 has a neck 12 at the normally uppermost end thereof defining an open top. A tube 14 having external threads 16 and 18 formed on the ends thereof is disposed within the tank 10 and longitudinally therewith.

The bottom wall 20 of tank 10 has an opening 22 formed therein for reception of the threaded end 18 of the tube 14. A lock nut 24 is threaded on the tube 14 within the tank 10 and a gasket 26 is interposed between the innermost face of the bottom wall 20 of tank 10 and the lock nut 24. A cap 28 also threaded on tube 14 exteriorly of wall 20 completes the parts for permanently affixing tube 14 to the bottom wall 20 of tank 10. This cap 28 may be removed for cleaning or replacement of the tube 14 if such becomes necessary.

An opening 30 formed in the tube 14 places the latter in communication with tank 10, such opening 30 being disposed near the lowermost end of tube 14 adjacent the nut 24.

A cover 32 having an outside diameter greater than the diameter of neck 12 of tank 10 is slidably mounted upon the tube 14 through the medium of a substantially central opening 34 formed therein. This cover 32 has a cavity 36 formed in the normally lowermost face thereof wherein is disposed a gasket 38 formed from relatively hard sponge rubber or like resilient material. This gasket 38 is likewise provided with a central opening 40 and circumscribes the tube 14 in the same manner as the cover 32 but with a relatively tight fit.

Sealing of gasket 38 about the tube 14 at the opening 40 is enhanced by an external shoulder 42 formed on tube 14 within the tank 10 and adjacent the neck 12 thereof and the positioning of a second relatively small gasket 44 between the gasket 38 and the shoulder 42. This small gasket 44 also of resilient material, telescopes the tube 14 in tight engagement therewith.

A washer 46, threaded upon the tube 14 exteriorly of the cover 32 received the lowermost end of a spring 48 coiled about that portion of the tube 14 extending outwardly beyond the outermost face of the cover 32. A wing-nut 50 threaded upon the end 16 of tube 14 may be adjusted to increase or decrease the tension of spring 48 as desired.

An air intake valve 52 of conventional character passes through an opening 54 in cover 32 and aligned opening 56 in the gasket 38 and is secured in place on said cover 32 and gasket 38. A flexible hose 58 interconnects the uppermost end of the tube 14 and a release valve 60. This release valve 60 in turn communicates with a conduit 62 having a nozzle 64 on one end thereof. A manually manipulable reciprocable valve stem 66 within the valve 60 controls the output of air and water from the tank 10 in the usual manner.

A bracket 68 circumscribing the tank 10 and affixed to the framework 70 of automobile 72 serves as the means of support for the tank 10. A pair of spaced apart laterally extending brackets 74 and 76 slidably support a rod 78 having a cork 80 mounted on the lowermost end thereof.

In operation, the tank 10 may be easily filled with water or other cleansing liquid 82 by first removing the conduit 58 from tube 14 and then removing the wing-nut 50. The coil spring 48, washer 46 and cover 32 may then be easily slipped from the tube 14 to expose the open top of container 10. When such cover 32 is removed, cork 80 will cause the rod 78 to move upwardly to indicate the amount of liquid within tank 10, thus eliminating the necessity of climbing upon the automobile 72 to a point where the amount of liquid 82 in tank 10 may be seen.

After filling tank 10 with liquid 82 to a predetermined level, the parts above mentioned are all re-assembled and air is forced into tank 10 through the stop valve 52. Manipulation of the valve 66 will then cause the liquid 82 to pass through conduit 62 and thence nozzles 64, where such liquid may be sprayed upon the windshield of automobile 72 in the usual manner when the washer is mounted as indicated in Fig. 1.

It is to be noted that there is no danger whatsoever of damaging the tank 10 or any of its component parts by accidentally forcing an over supply of air into tank 10 through the valve 52. When such a maximum amount of air is forced into tank 10, the lid 32 will automatically rise on the tube 14 against the action of the spring 48. Otherwise with the provision of gasket 38, the secondary gasket 34 and the manner in which gasket 38 also seals the valve, there will be no leakage of air or fluid from the open top of tank 10 when cover 32 is in place with spring 48 yieldably holding the same in such position.

In practice the nut 50 may be large enough to slip over tube 58 when manipulating the parts to remove cover 32. Thus, the end of the tube 58 is not worn by flexing.

Manifestly, such changes and modifications as come within the spirit of this invention are contemplated hereby and it is thus desired to be limited only by the scope of the appended claim.

Having thus described the invention, what is claimed as new and desired to be secured by Letters Patent is:

In a hydro-pneumatic windshield washer, an open top, cylindrical pressure tank; a centrally perforated cover plate for said top of the tank; a cavity formed in the lowermost face of said cover having a diameter greater than the diameter of the tank at said open top thereof; a first, flat, disc-like, centrally perforated, resilient gasket in said cavity; an elongated, liquid dispensing tube within the tank and secured to the bottom of the tank at the lowermost end of the tube, said tube extending through the perforations of the cover and the gasket and extending beyond the tank above the cover; external threads on the uppermost end of said tube; a wing nut on the tube in mesh with said threads; an external shoulder on the tube within the tank; a second resilient, pliable gasket between said shoulder and said first gasket, said gaskets surrounding the tube in engagement therewith; and a spring coiled about the tube, and compressed between said nut and the cover for holding the first gasket biased against the tank at its open top, for compressing the second gasket between the first gasket and said shoulder, and for forcing the second gasket into tight sealing contact with the tube.

CLARENCE E. STOW.
EARL E. BLACK.

REFERENCES CITED

The following references are of record in the file of this patent:

UNITED STATES PATENTS

| Number | Name | Date |
| --- | --- | --- |
| 1,069,155 | Malmstrom | Aug. 5, 1913 |
| 2,081,022 | Smith | May 18, 1937 |
| 2,178,964 | Hulse | Nov. 7, 1939 |